US012254214B2

(12) United States Patent
Takizawa (10) Patent No.: US 12,254,214 B2
(45) Date of Patent: Mar. 18, 2025

(54) INPUT OUTPUT CONTROL DEVICE (71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventor: Tetsuro Takizawa, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 0 days.

(21) Appl. No.: 18/475,359

(22) Filed: Sep. 27, 2023

(65) Prior Publication Data

US 2024/0126474 A1 Apr. 18, 2024

(30) Foreign Application Priority Data

Oct. 18, 2022 (JP) ................................. 2022-166580

(51) Int. Cl.
*G06F 3/00* (2006.01)
*G06F 3/06* (2006.01)

(52) U.S. Cl.
CPC .......... *G06F 3/0656* (2013.01); *G06F 3/0613* (2013.01); *G06F 3/0673* (2013.01)

(58) Field of Classification Search
CPC ..... G06F 3/0656; G06F 3/0613; G06F 3/0673
See application file for complete search history.

(56) References Cited

U.S. PATENT DOCUMENTS

| | | | |
|---|---|---|---|
| 2011/0164460 A1* | 7/2011 | Kajigaya | G11C 5/06 365/194 |
| 2017/0300251 A1* | 10/2017 | Kota | G06F 11/2635 |
| 2020/0326879 A1* | 10/2020 | Zhang | G06F 12/0246 |

OTHER PUBLICATIONS

"Highest Performance Prototyping System (HAPS)", Synopsys Inc., https://www.synopsys.com/ja-jp/verification/prototyping.html, 2023 (and English translation).
"ZeBu EP1", Synopsys, Inc., https://www.synopsys.com/ja-jp/verification/emulation.html, 2023.

* cited by examiner

*Primary Examiner* — Craig S Goldschmidt
(74) *Attorney, Agent, or Firm* — Posz Law Group, PLC

(57) ABSTRACT

An input output control device between a verification circuit and a semiconductor memory device includes: a first port that receives a read transaction for requesting reading of data in the semiconductor memory device from the verification circuit, and outputs a read response to the verification circuit; a second port that outputs the read transaction to the semiconductor memory device, and receives the read response output from the semiconductor memory device in response to the read transaction; and a buffer device that delays at least one of an output of the read transaction to the semiconductor memory device and an output of the read response to the verification circuit.

6 Claims, 7 Drawing Sheets

INPUT OUTPUT CONTROL DEVICE

CROSS REFERENCE TO RELATED APPLICATION

The present application claims the benefit of priority from Japanese Patent Application No. 2022-166580 filed on Oct. 18, 2022. The entire disclosure of the above application is incorporated herein by reference.

TECHNICAL FIELD

The present disclosure relates to an input output control device.

BACKGROUND

Conventionally, in the development of electronic circuits, there is known a technique of implementing verification by mounting an electronic circuit as a verification target on an FPGA (i.e., Field Programmable Gate Array) in order to verify the performance and functions of the electronic circuit. According to such a verification method, verification can be performed in a short time compared to verification by software.

SUMMARY

According to an example, an input output control device between a verification circuit and a semiconductor memory device may include: a first port that receives a read transaction for requesting reading of data in the semiconductor memory device from the verification circuit, and outputs a read response to the verification circuit; a second port that outputs the read transaction to the semiconductor memory device, and receives the read response output from the semiconductor memory device in response to the read transaction; and a buffer device that delays at least one of an output of the read transaction to the semiconductor memory device and an output of the read response to the verification circuit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

When the electronic circuit as a verification target requires a large amount of memory, verification may be performed by connecting a DRAM (i.e., Dynamic Random Access Memory) to the FPGA. However, since the operating frequency of the DRAM is much higher than that of the FPGA, there is a difficulty that the performance of the electronic circuit cannot be verified correctly. There is also a method of performing verification using an SRAM (i.e., Static Random Access Memory) whose operating frequency is slower than that of the DRAM. However, the price of the SRAM is higher than the DRAM, so that the verification cost is increased.

The present disclosure can be realized as the following embodiments.

According to one aspect of the present embodiments, an input output control device is provided. The input output control device is connected between a verification circuit and a semiconductor memory device and controls an input and an output of data.

The input output control device includes: a first port that inputs a read transaction for requesting reading of data of the semiconductor memory device from the verification circuit, and outputs a read response, received from the semiconductor memory device in response to the read transaction, to the verification circuit; a second port that outputs the read transaction to the semiconductor memory device, and receives the read response output from the semiconductor memory device in response to the read transaction; and a buffer device that delays at least one of the output of the read transaction to the semiconductor memory device and the output of the read response to the verification circuit.

According to this aspect of the input output control device, at least one of the output of the read transaction to the semiconductor memory device and the output of the read response to the verification circuit is delayed. It is possible to suppress the difference between the operating frequency of the verification device and the operating frequency of the semiconductor memory device and to suppress the deterioration of the accuracy of the performance verification of the verification circuit.

A. First Embodiment

A-1. Device Configuration

Figure 1:
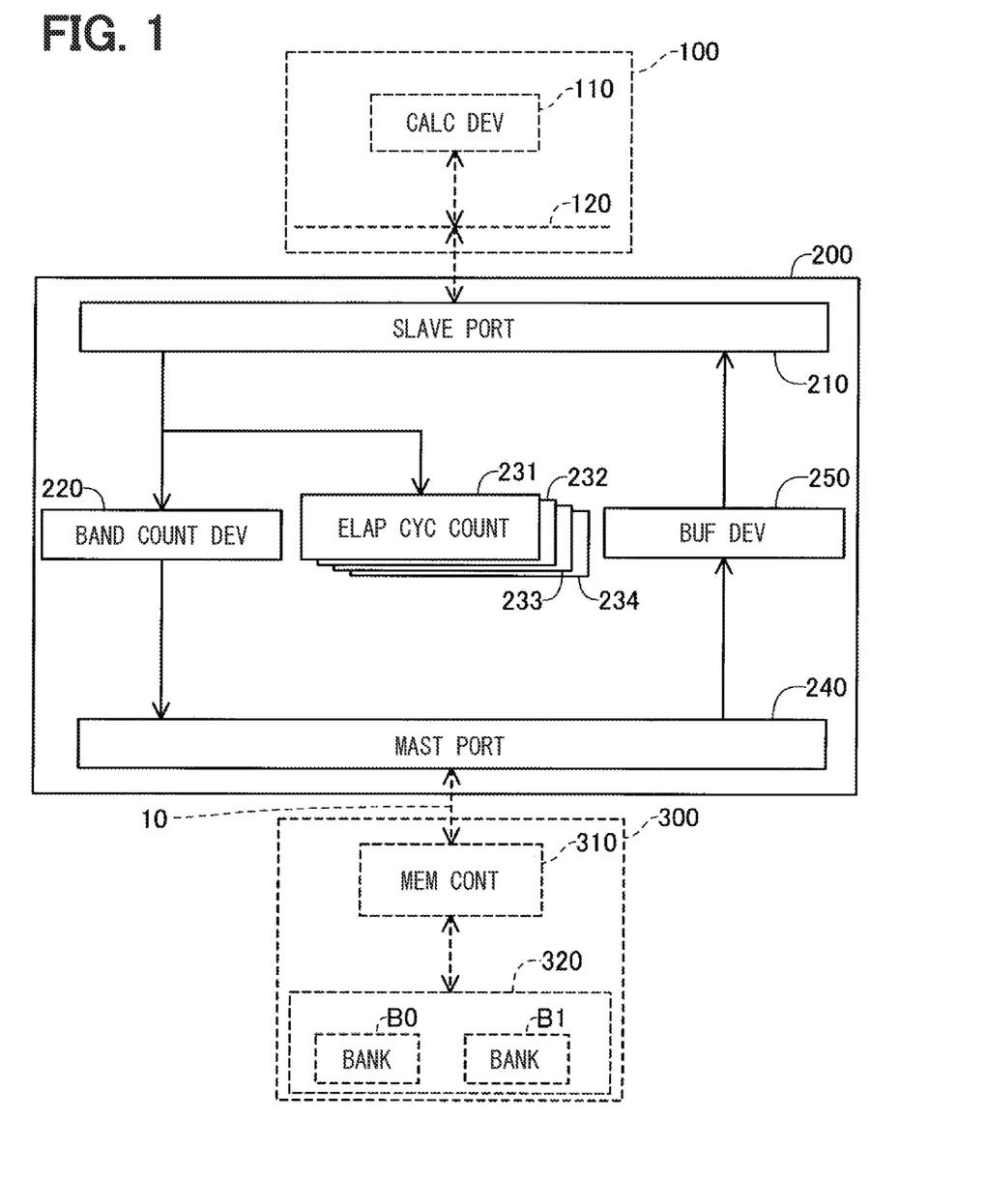
FIG. 1 is a block diagram showing a schematic configuration of an input output control device according to a first embodiment.

As shown in FIG. 1, the input output control device 200 is connected between the verification circuit 100 and the memory system 300 and controls an input and an output of data between the verification circuit 100 and the memory system 300. More specifically, the input output control device 200 delays the output of the read transaction from the verification circuit 100 to the memory system 300 and the output of the read response from the memory system 300 to the verification circuit 100 by a predetermined number of cycles.

In this embodiment, the verification circuit 100 is implemented by an FPGA (i.e., Field Programmable Gate Array) and includes a calculation device 110 and a bus 120. The calculation device 110 is connected to the input output control device 200 via the bus 120 and outputs transactions for requesting data access to the memory system 300 to the input output control device 200. In the following description, a transaction for requesting reading of data from the memory system 300 is defined as a "read transaction". In this embodiment, the read transaction output from the calculation device 110 has at least an ID, data amount, and an address as an access target.

The memory system 300 includes a memory controller 310 and a semiconductor memory device 320. The memory controller 310 converts a transaction output from the input output control device 200 into a protocol for processing by the semiconductor memory device 320 and outputs the protocol to the semiconductor memory device 320. In addition, the memory controller 310 converts the data output from the semiconductor memory device 320 according to the protocol into a read response to be processed by the calculation device 110 and outputs the read response to the input output control device 200 via the bus 10. The read response has the same ID as the corresponding read transaction.

The semiconductor memory device 320 is configured to read and write data with an arbitrary storage unit designated by a protocol output from the memory controller 310. In this embodiment, the semiconductor memory device 320 is configured as a DRAM having banks B0 and B1. Here, the semiconductor memory device 320 may have only one bank or three or more banks.

The input output control device 200 includes a slave port 210, a band counter device 220, elapse cycle counters 231 to 234, a master port 240 and a buffer device 250.

The slave port 210 is interconnected with the verification circuit 100 to receive transactions from the verification circuit 100 and output read responses to the verification circuit 100. The slave port 210 corresponds to the "first port" in this disclosure.

The band counter device 220 counts the amount of access data, and suspends the output of the read transactions to the memory system 300 when the amount of access data within a predetermined time exceeds a predetermined target band. The "access data amount" means the total amount of the data in the read transaction output to the memory system 300 per unit time. A "target band" means a value that defines a target for the usage band of the bus 10. Also, the band counter device 220 outputs the read transaction to the memory system 300 via the master port 240 when the amount of access data is equal to or less than the target band. Specific processing by the band counter device 220 will be described in the transaction output process described later.

The elapse cycle counters 231 to 234 hold the number of elapse cycles after the read transaction is output to the memory system 300 for each read transaction. Each of the elapse cycle counters 231 to 234 has a parameter (hereinafter also referred to as "busy") indicating whether or not the number of elapse cycles is counted and held. Busy "0" indicates that the number of elapse cycles is not held, that is, not counted, and busy "1" indicates that the number of elapse cycles is held, that is, counted. Specific processing by the elapse cycle counters 231 to 234 will be described in the transaction output process and the response output process described later.

In the input output control device 200 of this embodiment, it may be preferable that the number of elapse cycle counters equal to the maximum number of outstanding read transactions is provided. The "maximum number of outstanding" means the maximum number of read transactions that can be output continuously without the calculation device 110 receiving read responses. With such a configuration, the input output control device 200 can process the read transactions continuously output from the calculation device 110 in parallel without excess or deficiency.

The master port 240 connects with the memory system 300 to output transactions to the memory system 300 and receive read responses from the memory system 300. The master port 240 corresponds to the "second port" in this disclosure.

The buffer device 250 withholds the read response when the number of elapse cycles is less than a predetermined threshold. In this embodiment, the buffer device 250 holds the read response in FIFO (i.e., First-In First-Out) format. Also, the buffer device 250 outputs a read response to the verification circuit 100 via the slave port 210 when the number of elapse cycles is equal to or greater than the threshold. Specific processing by the buffer device 250 will be described in the response output process described later.

A-2. Transaction Output Process

Figure 2:
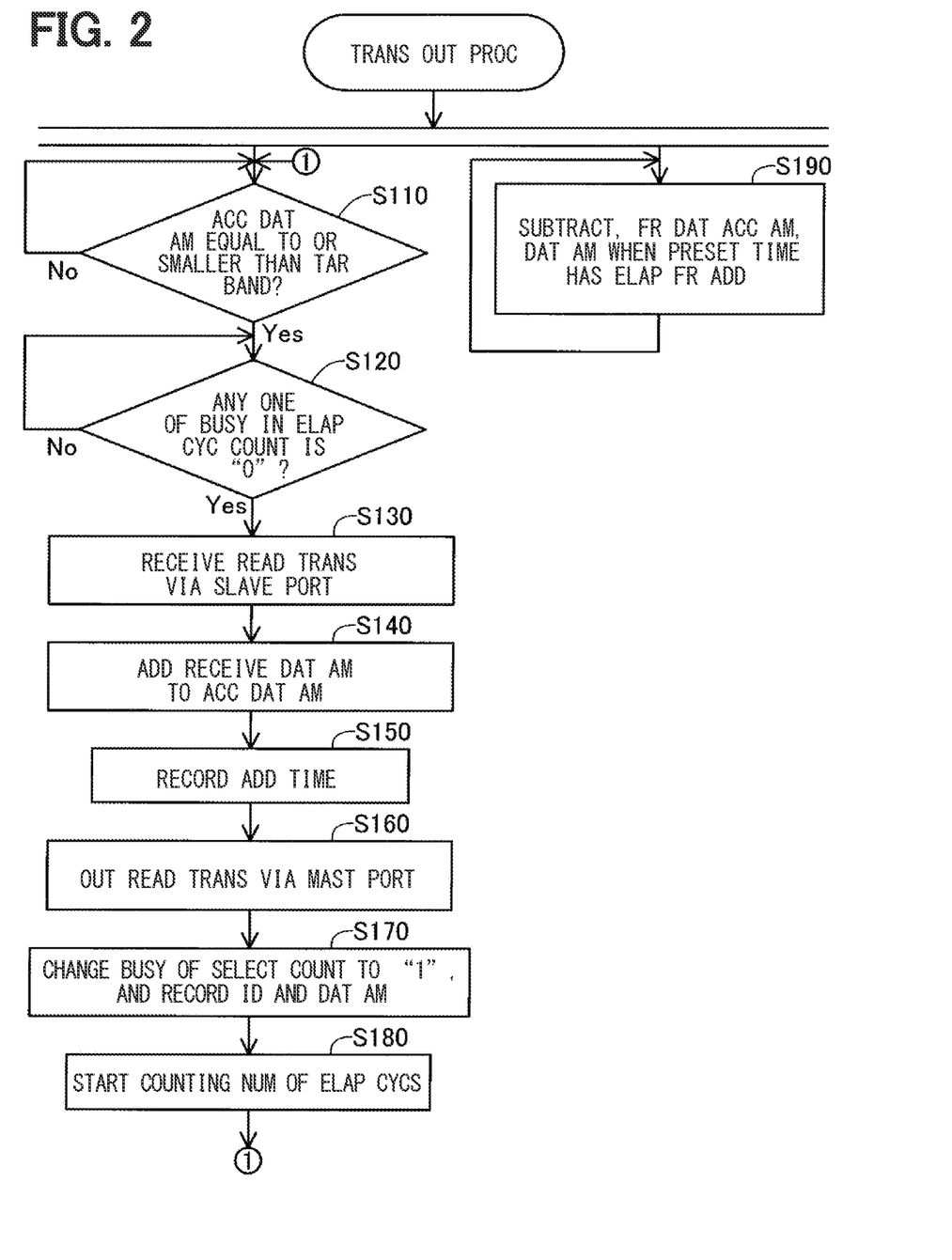
FIG. 2 is a flow chart showing a procedure of a transaction output process according to the first embodiment.

When outputting a read transaction to the memory system 300, the input output control device 200 executes the transaction output process shown in FIG. 2. When a read transaction is output from verification circuit 100, the band counter device 220 determines whether or not the amount of access data is equal to or less than the target band (at step S110).

If it is determined that the amount of access data is equal to or less than the target band ("YES" at step S110), the input output control device 200 determines whether at least one busy of the elapse cycle counters 231 to 234 is "0" (at step S120). When it is determined that at least one busy of the elapse cycle counters 231 to 234 is "0" ("YES" at step S120), the input output control device 200 receives a read transaction via the slave port 210 (at step S130).

On the other hand, if it is determined that the amount of access data exceeds the target band ("NO" at step S110), or if the busy of all cycle counters 231 to 234 are "1" ("NO" at step S120), the input and output control device 200 stops receiving read transactions via the slave port 210. In this embodiment, the read transactions are held in the verification circuit 100 while the reception of read transactions is stopped.

In step S140, the band counter device 220 adds the data amount of the received read transaction (hereinafter also referred to as the "receive data amount") to the holding access data amount to obtain a new access data amount. Also, in step S150, the band counter device 220 records the time when the receive data amount is added to the access data amount.

In step S160, the band counter device 220 outputs a read transaction via the master port 240.

In step S170, one of the elapse cycle counters 231 to 234 whose busy is "0" (hereinafter also referred to as a "selection counter") is changed to have the busy of "1", and the ID and the data amount of the output transaction are recorded. Also, in step S180, the selection counter starts counting the number of elapse cycles. The selection counter newly holds a value obtained by adding "1" to the holding number of elapse cycles each time one cycle elapses.

The input output control device 200 repeatedly executes the above-described steps S110 to S180 each time the verification circuit 100 outputs a read transaction.

In parallel with steps S110 to S180 described above, the band counter device 220 subtracts, from the access data amount, the amount of data when a predetermined time has passed since the addition (at step S190). In this embodiment, the band counter device 220 can count and hold the amount of access data within a preset time frame by repeating this step.

A-3. Response Output Process

Figure 3:
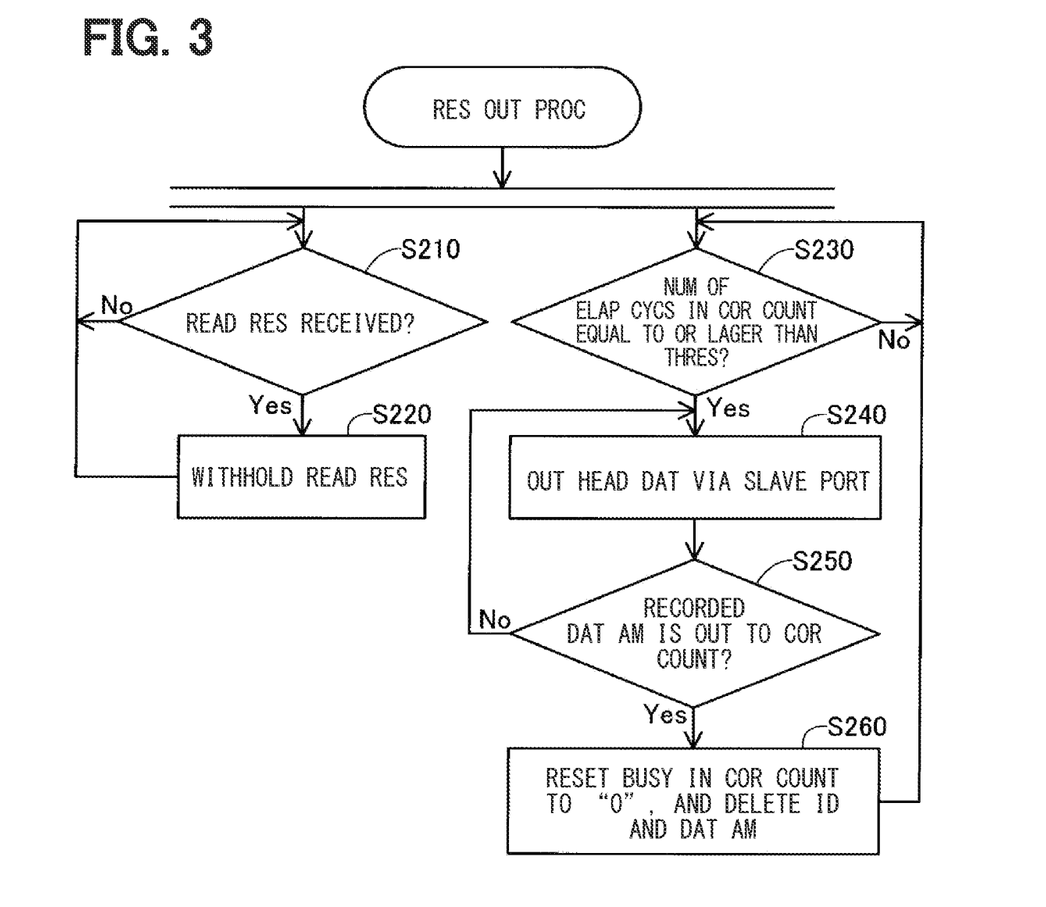
FIG. 3 is a flow chart showing a procedure of a response output process according to the first embodiment.

When outputting a read response to the verification circuit 100, the input output control device 200 executes a response output process shown in FIG. 3. When the input output control device 200 receives a read response via the master port 240 ("YES" at step S210), the buffer device 250 holds the received read response (at step S220). The buffer device 250 repeatedly executes steps S210 and S220.

In parallel with steps S210 and S220, the buffer device 250 determines whether or not the number of elapse cycles of the corresponding counter is equal to or greater than a preset threshold (at step S230). The "corresponding counter" means an elapse cycle counter among the elapse cycle counters 231 to 234 whose recorded ID matches the ID of the head data in the buffer device 250. If it is determined that the number of elapse cycles of the corresponding counter is less than the threshold ("NO" at step S230), the buffer device 250 stands by while holding the data.

When it is determined that the number of elapse cycles of the corresponding counter is equal to or greater than the threshold ("YES" at step S230), the buffer device 250 outputs the head data via the slave port 210 (at step S240). Such a threshold value is set as a value specified in advance by conducting an experiment or the like so as to simulate the latency when the memory system 300 is connected to the electronic circuit simulated by the verification circuit 100.

In step S250, the buffer device 250 determines whether or not the amount of data recorded in the corresponding counter has been output (at step S250). If it is determined that the amount of data recorded in the corresponding counter has not been output ("NO" at step S250), the buffer device 250 repeatedly executes steps S240 and S250 until the data with the data amount recorded in the corresponding counter is output.

If it is determined that the amount of data recorded in the corresponding counter has been output ("YES" at step S250), the buffer device 250 resets the busy of the corresponding counter to "0", and deletes the ID and the data amount recorded therein (at step S260). After this step, the corresponding counter is again in a state of being able to count the number of elapse cycles of another read transaction. The input output control device 200 repeatedly executes steps S230 to S260.

According to the input output control device 200 described above, the output of the read transaction to the memory system 300 and the output of the read response to the verification circuit 100 are delayed. It is possible to suppress the difference between the operating frequency of the verification circuit 100 and the operating frequency of the memory system 300, and to suppress the reduction of the accuracy in the performance verification of the verification circuit 100.

B. Second Embodiment

Figure 4:
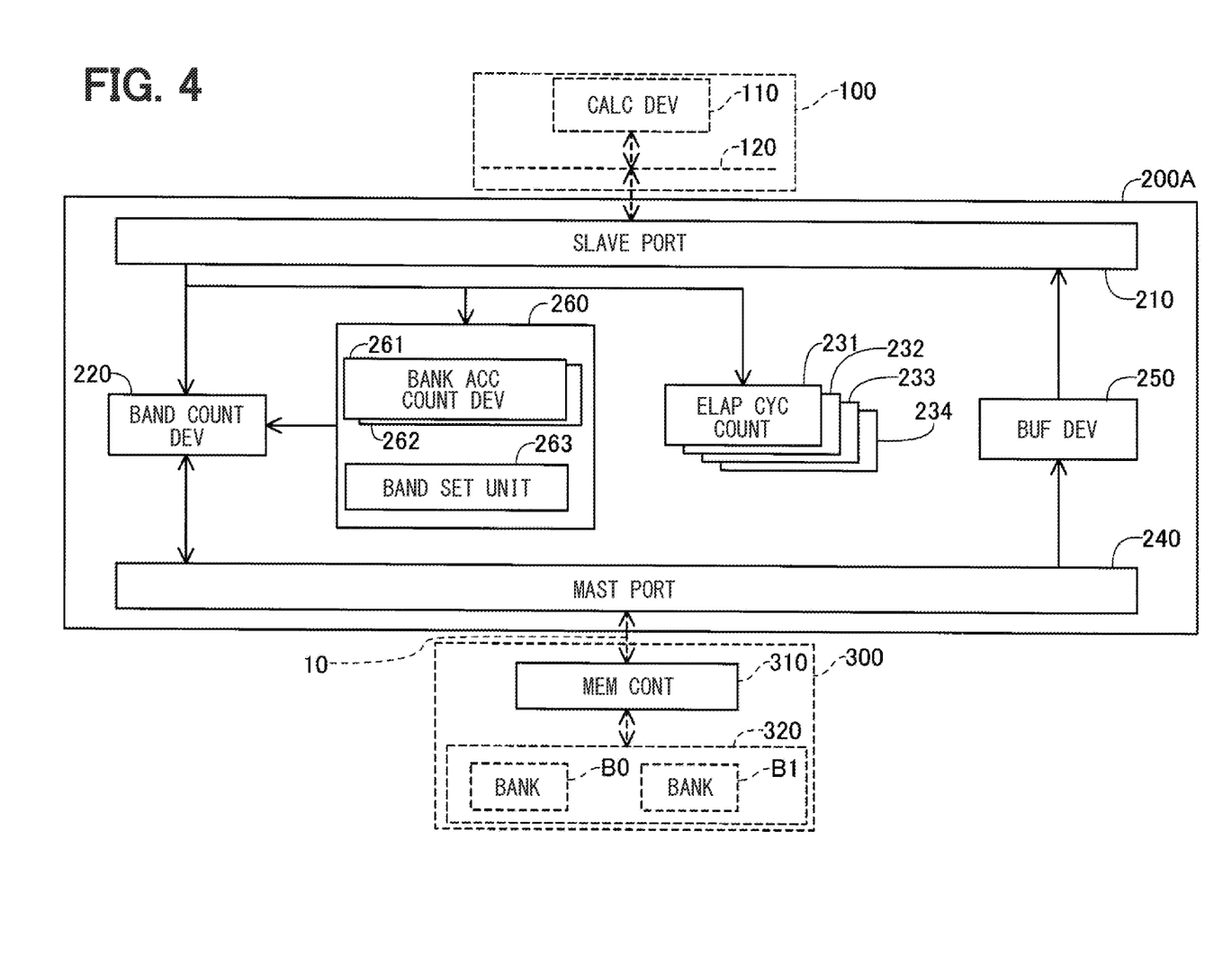
FIG. 4 is a block diagram showing a schematic configuration of an input output control device according to a second embodiment.
Figure 5:
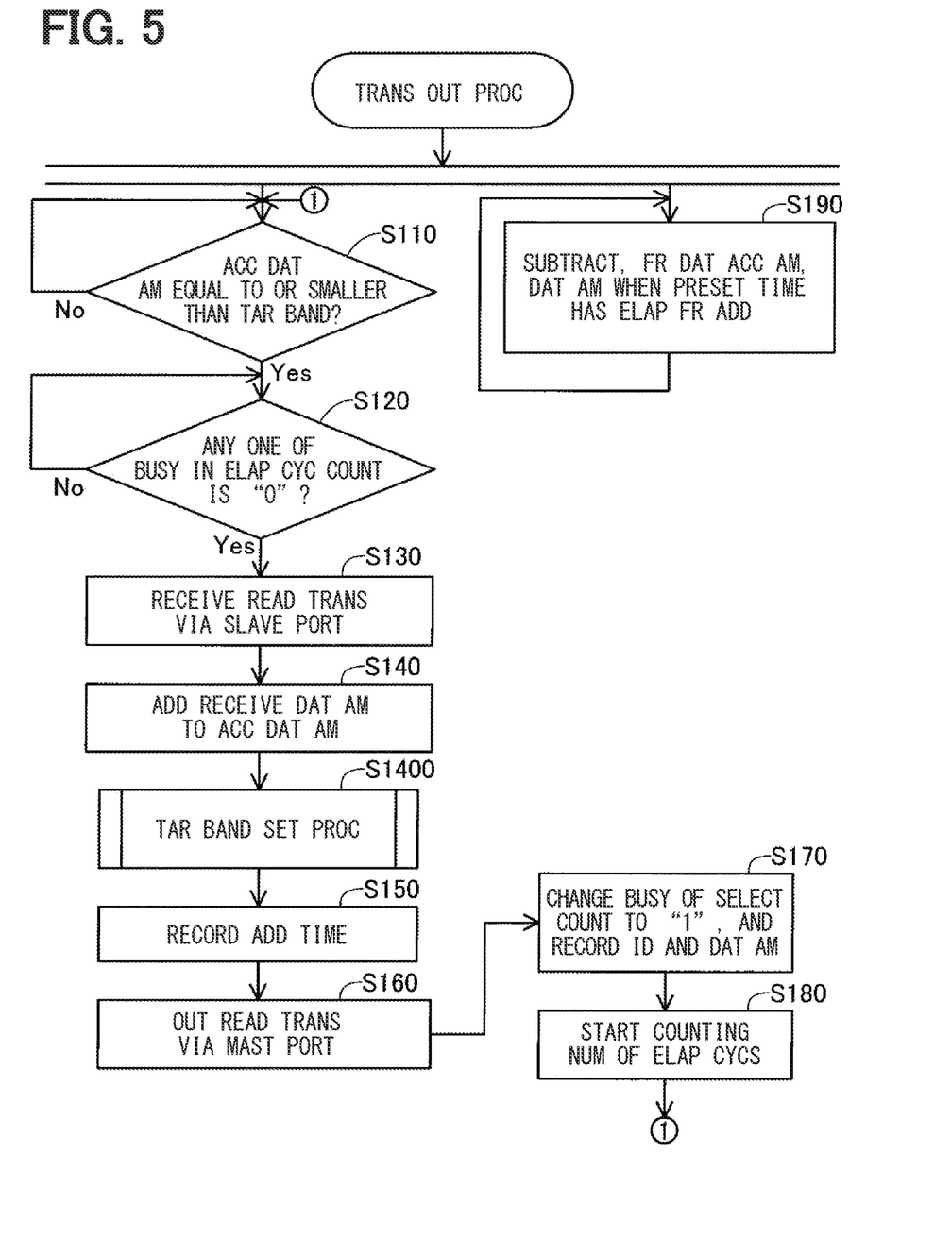
FIG. 5 is a flow chart showing a procedure of a transaction output process according to the second embodiment.

The input output control device 200A of the second embodiment is different from the input output control device 200 of the first embodiment that the input output control device 200A includes a target band generation device 260 as shown in FIG. 4, and, as shown in FIG. 5, executes the target band setting process (at step S1400) after step S140 in the transaction output process. Other device configurations of the input output control device 200A and other procedures in the transaction output process of the second embodiment are the same as those of the input output control device 200 of the first embodiment. The same reference numerals are given to the same configurations and the same procedures, and detailed description thereof is omitted.

As shown in FIG. 4, the target band generation device 260 includes bank access counter devices 261 and 262 and a band setting unit 263. The bank access counter devices 261 and 262 respectively count and hold the amount of bank access data for banks B0 and B1, and record the previous access page in each bank. "Bank access data amount" means the total value of the data amount of read transactions issued consecutively to the same page in each bank. The "previous access page" means the page address as an access target by the previously output read transaction in each bank. It is assumed that the number of bank access counter devices included in the target band generation device 260 is the same as the number of banks included in the semiconductor memory device 320. Processing in the bank access counter devices 261 and 262 will be described later in the target band setting process.

The band setting unit 263 calculates the average value of the bank access data amounts held in the bank access counter devices 261 and 262, respectively. Also, the band setting unit 263 sets the target band using the calculated average value of the bank access data amount.

As shown in FIG. 5, after step S140, the target band generation device 260 executes the target band setting process (at step S1400), and updates the target band referred to in step S110 described above.

Figure 6:
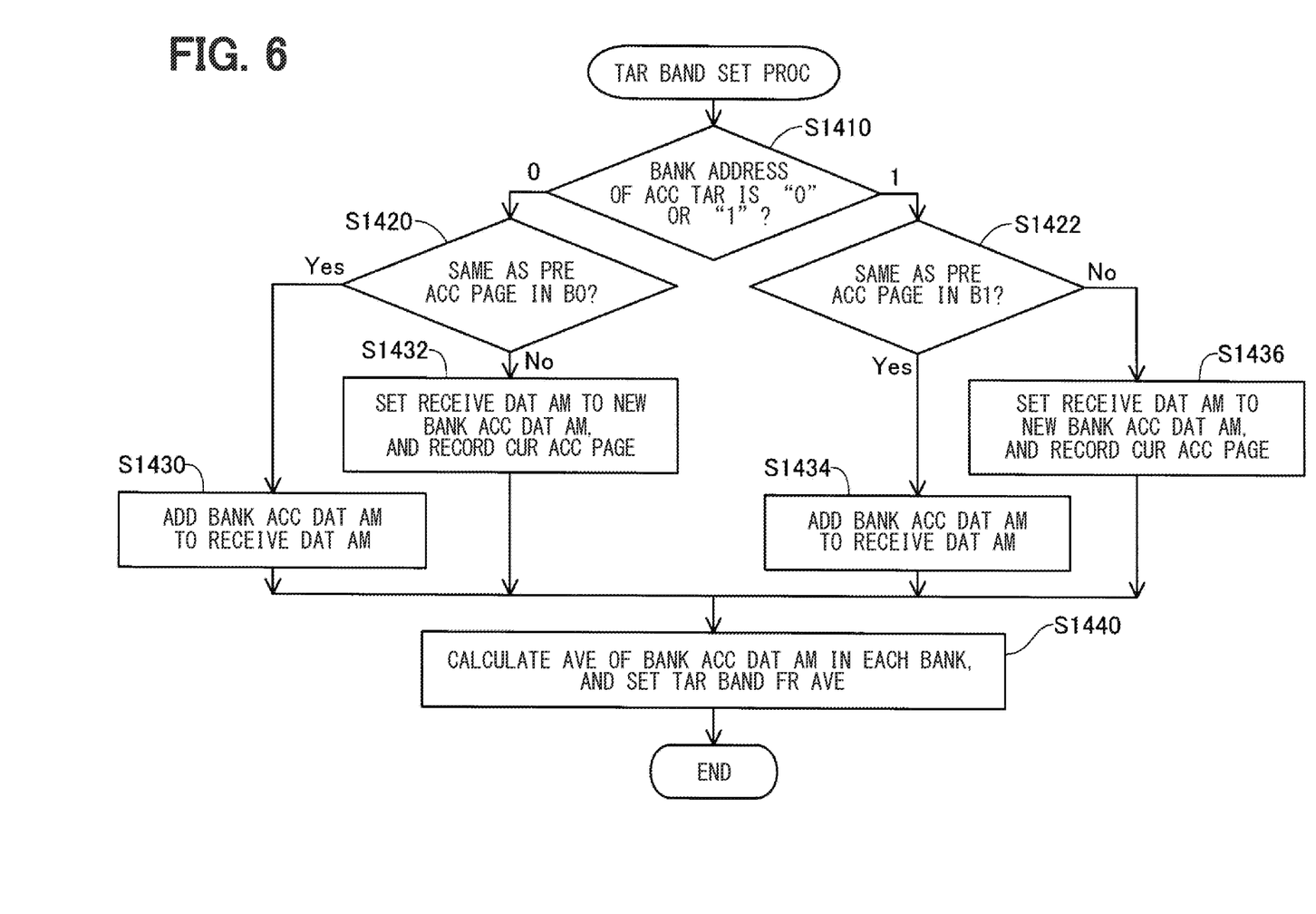
FIG. 6 is a flow chart showing a procedure of a target band setting process according to the second embodiment.

In the target band setting process shown in FIG. 6, the target band generation device 260 determines whether the bank address as the access target in the read transaction is "0" or "1" (at step S1410). If the bank address as the access target is determined to be "0", it is determined whether the page address as the access target in the received read transaction (hereinafter also referred to as "current access page") is the same as the previous access page in bank B0 (at step S1420).

If the current access page is the same as the previous access page ("YES" at step S1420), the bank access counter device 261 adds the received data amount to the holding bank access data amount as a new bank access data amount (at step S1430).

If the current access page is different from the previous access page ("NO" at step S1420), the bank access counter device 261 sets the received data amount as a new bank access data amount and records the current access page (at step S1432).

On the other hand, if it is determined that the bank address as the access target is "1", it is determined whether or not the current access page is the same as the previous access page in bank B1 (at step S1422).

If the current access page is the same as the previous access page ("YES" at step S1422), the bank access counter device 262 adds the received data amount to the holding bank access data amount as a new bank access data amount (at step S1434).

Figure 7:
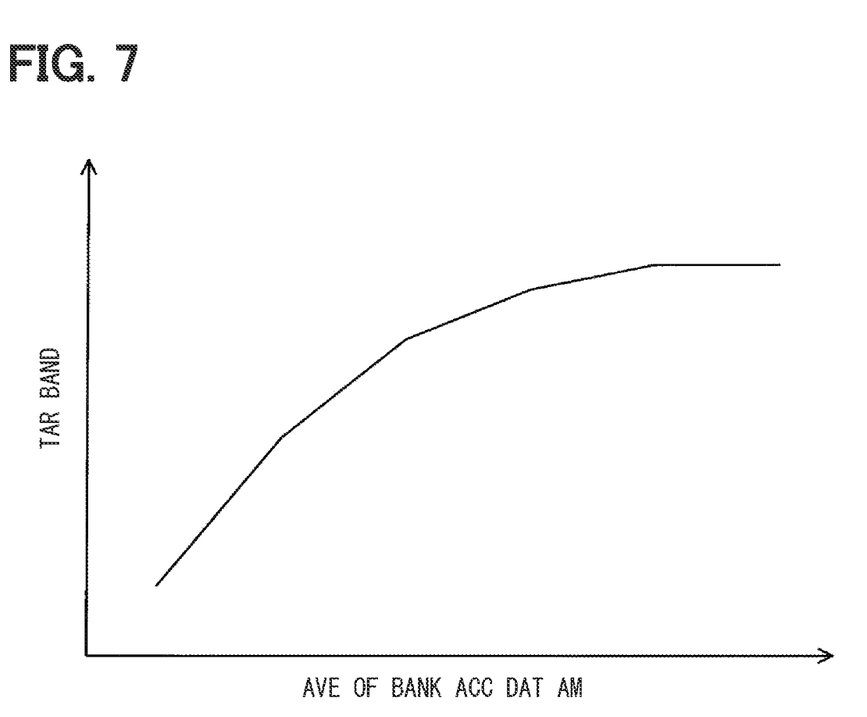
FIG. 7 is an explanatory diagram showing an example of the relationship between the average of the bank access data amount and the target band.

If the current access page is different from the previous access page ("NO" at step S1422), the bank access counter device 262 sets the received data amount as a new bank access data amount and records the current access page (at step S1436). In step S1440, the band setting unit 263 calculates the average value of the bank access data amounts counted and held in the bank access counter devices 261 and 262, respectively, and sets the target band based on the calculated average value. In this embodiment, the band setting unit 263 sets the target band using the table shown in FIG. 7 showing the relationship between the average value of the bank access data amount and the target band. In this embodiment, the table has a relationship that the target band increases as the average value of the bank access data amount increases. More specifically, the table has a relationship in which the slope of the amount of increase in the target band decreases as the average value of the bank access data amount increases. With this, the target band generation device 260 ends the target band setting process.

According to the input output control device 200A of the second embodiment described above, the target band is set according to the average value of the bank access data amount counted and held in each of the bank access counter devices 261 and 262, the output of the read transaction to the memory system 300 can be delayed according to the change in the amount of access data, and the deterioration of the accuracy of the performance verification of the verification circuit 100 can be further suppressed.

C. Other Embodiments (C1) In the above embodiment, the number of elapse cycle counters equal to the maximum outstanding number is provided, alternatively, the present disclosure may not be limited to this feature. The elapse cycle counters may be provided with the number thereof less than the maximum outstanding number. This feature also provides the same effects as the above embodiment.

(C2) In the above embodiment, the input output control device 200 includes the buffer device 250 and the band counter device 220, alternatively, the present disclosure may not be limited to this feature. The input output control device 200 may include only the buffer device 250 out of the buffer device 250 and the band counter device 220. In this feature as well, the input output control device 200 can delay the output of the read response to the verification circuit 100. Therefore, the difference between the operating frequency of the verification circuit 100 and the operating frequency of the semiconductor memory device 320 is suppressed, and the reduction of the accuracy of performance verification of the circuit 100 can be suppressed.

(C3) In the above embodiment, the table has a relationship in which the slope of the amount of increase in the target band decreases as the average value of the bank access data amount increases, alternatively, the present disclosure may not be limited to this feature. The table may have a relationship in which the target band increases linearly as the average value increases. This feature also provides the same effects as the above embodiment.

The input output control device 200 and the technique of the display device according to the present disclosure may be achieved by a dedicated computer provided by constituting a processor and a memory programmed to execute one or more functions embodied by a computer program. Alternatively, the input output control device 200 and the technique of the display device according to the present disclosure may be achieved by a dedicated computer provided by constituting a processor with one or more dedicated hardware logic circuits. Alternatively, the input output control device 200 and the technique of the display device according to the present disclosure may be achieved using one or more dedicated computers constituted by a combination of a processor and a memory programmed to execute one or more functions and a processor formed of one or more hardware logic circuits. The computer program may be stored in a computer-readable non-transitory tangible recording medium as an instruction to be executed by the computer.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, some of the technical features may be omitted as appropriate.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S110. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An input output control device connected between a verification circuit and a semiconductor memory device and controlling data input and data output, the input output control device comprising:
    a first port that receives at least one read transaction for requesting reading of data in the semiconductor memory device from the verification circuit, and outputs a read response, received from the semiconductor memory device in response to the at least one read transaction, to the verification circuit;
    a second port that outputs the at least one read transaction to the semiconductor memory device, and receives the read response output from the semiconductor memory device in response to the at least one read transaction;
    a buffer device that delays at least one of an output of the at least one read transaction to the semiconductor memory device and an output of the read response to the verification circuit; and
    a band counter device that counts an access data amount, wherein each read transaction has a corresponding size and specifies at least a data amount and an access target address, wherein the access data amount is a total of the sizes of the at least one read transaction output to the semiconductor memory device within a predefined time, wherein:
    the band counter device suspends the output of the at least one read transaction to the semiconductor memory device via the second port when the access data amount exceeds a preset target band; and the band counter device outputs the at least one read transaction to the semiconductor memory device via the second port when the access data amount is equal to or smaller than the preset target band.

2. The input output control device according to claim 1, further comprising:
at least one elapse cycle counter that counts a numerical number of elapse cycles for the at least one read transaction after the at least one read transaction is output to the semiconductor memory device, wherein:
the buffer device suspends the read response when the numerical number of elapse cycles is less than a preset threshold value, and outputs the read response to the verification circuit via the first port when the numerical number of elapse cycles is equal to or greater than the preset threshold value.

3. The input output control device according to claim 2, wherein:
a total number of the at least one elapse cycle counter is the same as a maximum number of outstanding read transactions of the at least one read transaction.

4. The input output control device according to claim 1, wherein:
the band counter device suspends the output of the at least one read transaction to the semiconductor memory device when the access data amount within a preset time exceeds the preset target band.

5. The input output control device according to claim 1, further comprising:
a target band generation device that generates the preset target band of the band counter device, wherein:
the target band generation device includes:
a plurality of bank access counter devices, a total number of the bank access counter devices is the same as a total number of a plurality of banks included in the semiconductor memory device,
wherein each of the bank access counter devices:
is respectively targeted to a respective different one of the banks, and
counts a bank access data amount for the respective different one of the banks, the bank access data amount being a total the data amounts specified in all read transactions including the at least one read transaction continuously issued to a same page in the respective different one of the banks; and
a band setting unit that calculates an average value of the bank access data amount counted by each of the bank access counter devices, and sets the preset target band using a preset table indicating a relationship between a calculated average value and the preset target band;
each of the bank access counter devices:
adds the data amount of the at least one read transaction to the bank access data amount to obtain a new bank access data amount when a current access page as access page as an access target of a previously output read transaction in the respective different one of the banks; and
sets the data amount of the at least one read transaction as the new bank access data amount when the current access page is different from the previous access page.

6. The input output control device according to claim 5, wherein:
the preset table is set so that the preset target band increases as the average value increases.

* * * * *